US008752453B2

(12) United States Patent
Plassiard et al.

(10) Patent No.: US 8,752,453 B2
(45) Date of Patent: Jun. 17, 2014

(54) AUTOMATIC ENGAGEMENT AND DISENGAGEMENT BICYCLE PEDAL

(75) Inventors: Alain Plassiard, Modra (SK); Jean-Francois De Bast, Vaulx-Milieu (FR)

(73) Assignee: Time Sport International (FR)

( * ) Notice: Subject to any disclaimer, the term of this patent is extended or adjusted under 35 U.S.C. 154(b) by 0 days.

(21) Appl. No.: 13/448,713

(22) Filed: Apr. 17, 2012

(65) Prior Publication Data

US 2012/0260768 A1 Oct. 18, 2012

(30) Foreign Application Priority Data

Apr. 18, 2011 (FR) ...................................... 11 53332

(51) Int. Cl.
*B62M 3/08* (2006.01)
(52) U.S. Cl.
CPC ...................................... *B62M 3/086* (2013.01)
USPC ........................................ 74/594.6; 74/594.4
(58) Field of Classification Search
CPC ...................................................... B62M 3/086
USPC ............................................. 74/594.4, 594.6
IPC ........................................................ B62M 3/08
See application file for complete search history.

(56) References Cited

U.S. PATENT DOCUMENTS

| 4,840,086 | A | 6/1989 | Bidal |
| 5,131,291 | A | 7/1992 | Beyl |
| 5,259,270 | A | 11/1993 | Lin |
| 5,733,145 | A * | 3/1998 | Wood ............................ 439/604 |
| 6,425,304 | B1 * | 7/2002 | Bryne ........................... 74/594.6 |
| 6,520,048 | B2 * | 2/2003 | Chen ............................. 74/594.6 |
| 7,322,259 | B2 * | 1/2008 | De Bast et al. .............. 74/594.6 |
| 7,509,889 | B2 * | 3/2009 | Chen ............................. 74/594.6 |
| 7,743,682 | B2 * | 6/2010 | Couturet et al. ............. 74/594.6 |
| 2004/0154432 | A1 | 8/2004 | De Bast et al. |

(Continued)

FOREIGN PATENT DOCUMENTS

| EP | 0296898 A1 | 12/1988 |
| EP | 0424210 A1 | 4/1991 |

(Continued)

OTHER PUBLICATIONS

FR2809701—Machine Translation.*

(Continued)

*Primary Examiner* — Vinh Luong
(74) *Attorney, Agent, or Firm* — The Belles Group, P.C.

(57) ABSTRACT

A bicycle pedal with automatic engagement and disengagement, including a body rotatably mounted on a pedal axle one side including a front hoop and a rear hoop, each hoop having two branches connected by a crossmember, at least one of the hoops being mounted to rotate about a geometrical axis parallel to that of the pedal and being spring-loaded toward the other hoop by spring means, the space between the hoops being adapted to receive and to clamp a cycling shoe cleat; the spring-loading means of the hoop are situated, in a direction orthogonal to the branches of the hoop, outside the space between the branches; the pedal body includes exterior arms spaced from the interior arms to form yokes having facing orifices in which two coaxial individual axles, respectively associated with each branch, are engaged and supported, and the individual axles composing the articulation axle of the rotary hoop.

6 Claims, 3 Drawing Sheets

(56) References Cited

U.S. PATENT DOCUMENTS

| | | |
|---|---|---|
| 2007/0137431 A1 | 6/2007 | Couturet et al. |
| 2010/0005923 A1* | 1/2010 | Chen .......................... 74/594.6 |
| 2011/0083530 A1* | 4/2011 | Inoue .......................... 74/594.6 |
| 2012/0125147 A1* | 5/2012 | Inoue .......................... 74/594.6 |

FOREIGN PATENT DOCUMENTS

| | | | |
|---|---|---|---|
| EP | 2292506 A1 | 3/2011 | |
| FR | 2809701 A1 | 12/2001 | |
| FR | 2 822 433 * | 9/2002 | ............ B62M 3/08 |
| FR | 2822127 A1 | 9/2002 | |
| FR | 2850079 A1 | 7/2004 | |
| FR | 2892696 A1 | 5/2007 | |

OTHER PUBLICATIONS

FR2809701A1—Machine Translation.*

English Abstract of FR 2 822 433; Frank Savard; Sep. 2002.*

\* cited by examiner

AUTOMATIC ENGAGEMENT AND DISENGAGEMENT BICYCLE PEDAL

PRIORITY

Priority is claimed, under 35 U.S.C. §119(a), to French Application No. 11 53332, filed Apr. 18, 2011, the disclosure of which is incorporated herein by reference in its entirety.

The invention relates to a bicycle pedal, notably an all-terrain bicycle (ATB) pedal, with automatic engagement and disengagement, of the kind that comprises a body rotatably mounted on a pedal axle with, on one face at least, a front hoop and a rear hoop, each hoop having two branches connected by a crossmember, one at least of these hoops being mounted in to rotate about a geometrical axis parallel to that of the pedal and being spring-loaded toward the other hoop, the space between the hoops being adapted to receive and to clamp a cleat fixed to the bottom of a cycling shoe.

FR 2 809 701 disclosed a pedal of this kind in which the pedal body is constituted of two half-bodies mounted to rotate relative to each other. The rotary hoop is mounted on one of the half-bodies and the other hoop is mounted on the other half-body. The means for spring-loading the rotary hoop are situated, in a direction orthogonal to the branches of the hoop, outside the space between the branches. The space between the branches of the rotary hoop is occupied by the other half-body.

From the patents EP 0 424 210 and FR 2 850 079 there are known pedals enabling easy and fast attachment of a cleat fixed to the bottom of the sole of a shoe whilst being of simple construction with a small number of component parts, leading co relatively economical manufacture.

The hoops constituting the mechanism for attaching the cleat assure relatively efficacious disengagement, of the central area between the branches of these hoops, which enables the evacuation of mud or dirt. In particular when these pedals are used for ATB bicycles, the cyclist must sometimes dismount from the bicycle in muddy areas and walk, and then remount their bicycle and engage the shoe with the pedal, although the sole and the cleat of the shoe may be coated with mud.

There are known, notably from FR 2 892 696, pedals in which at least one of the hoops may be moved about axes that are not aligned. In this case, the mobile hoop is not mounted to rotate about a geometrical axis parallel to that of the pedal and its movement is accompanied by deformation in flexing and twisting and/or in twisting that is not entirely satisfactory.

Above all, the invention has the object of providing a bicycle pedal of the kind defined above which, whilst remaining simple and economic to manufacture, enables total clearance of the central area of the mobile hoop, between the branches, this mobile hoop still being mounted to rotate about a geometrical axis parallel to that of the pedal.

According to the invention, in a bicycle pedal with automatic engagement and disengagement, of the kind defined above, and in which the means for spring-loading the rotary hoop are situated, in a direction orthogonal to the branches of the hoop, outside the space between the branches, the pedal body is provided with exterior arms spaced from the interior arms to form yokes provided with facing orifices in which are engaged and supported at each of their ends two coaxial individual axles respectively associated with each branch and, at a distance from each other in the central area, the individual axles composing the articulation axle of the rotary hoop, so as to leave free the central portion of the pedal.

A large clearance is thus obtained in the central area of the mobile hoop.

The interior arms on the side opposite the rotary hoop are preferably extended and join at a wall to form the avoidance boss against which the fixed hoop of the opposite side bears.

The spring-loading means may be constituted by turns that are provided as each free end of the branches of the hoop and that are accommodated between the arms.

The rotary hoop may be situated in front of the pedal, in the direction of movement of the bicycle. The pedal is generally provided on both its sides with a front hoop and a rear hoop in a symmetrical manner with respect to the geometrical rotation axis of the pedal.

The rotary hoop is advantageously constituted by a metal wire and the spring-loading means are constituted by turns of a winding of the wire of the hoop at the ends of the branches, the turns being situated outside the space between the branches and having an articulation axle of the hoop pass through them.

The hoop that is not rotatably mounted is preferably fixedly retained in the pedal body. This fixed hoop may be provided at the rear of the pedal body. It may be constituted of a metal wire including, at each free end of its branches, a loop through which passes the articulation axle of the mobile hoop of the side opposite that of the hoop concerned. The hoop may be retained in a fixed position by complementary stops provided on the pedal body, the hoop bearing, on the side opposite the stops, against an avoidance boss provided on the pedal body.

The pedal body is advantageously produced in plastic material and is provided with stops for the rotary hoop constituted by a plane wall area parallel to the pedal axle. A linear contact is assured between the cylindrical metal branch of the hoop and the plane wall area, with a relatively large tolerance for the position of the branches of the hoop. The area of contact may then increase through hammering of the plastic material and become partially cylindrical, with an imprint created by the branch of the hoop bearing on it.

The pedal body is preferably produced in one piece.

in the case of a plastic material body, the branches of the rotary hoop designed to come into contact with the stops provided on the pedal body may be overmolded with a plastic material in order to increase the areas of contact between the body and the branches of the hoop.

Apart from the features disclosed above, the invention consists in a number of other features referred to more explicitly hereinafter in connection with a non-limiting embodiment described with reference to the appended drawings. In the drawings.

Figure 1:
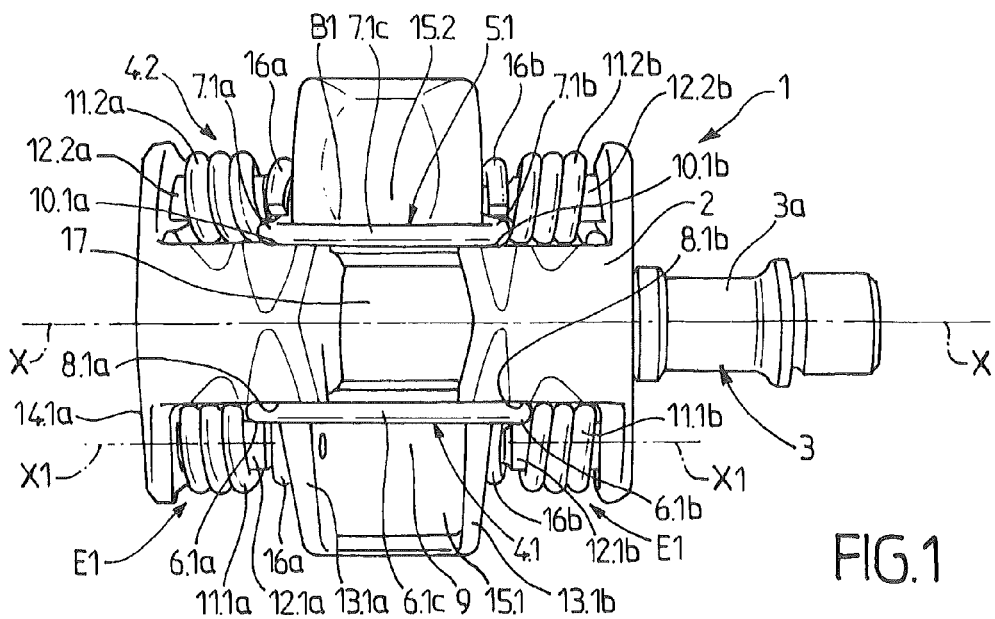
FIG. 1 is a plan view of a bicycle pedal of the invention.

Referring to the drawings, notably to FIG. 1, there may be seen a bicycle pedal 1, notably for an all-terrain bicycle (ATB), with automatic engagement and disengagement. The terms "front" and "rear" used in the description are to be understood for a pedal in a substantially horizontal position mounted on a bicycle and the normal direction of forward movement of the bicycle.

The pedal 1 includes a body 2 rotatably mounted on a pedal axle 3 a portion 3a of which projects from one side of the body and is designed to include a screwthread for mounting it at the end of a crank. The body is made in one piece.

The pedal 1 includes, on at least one side of the body, a front hoop 4.1 and a rear hoop 5.1. Each hoop has two branches, respectively 6.1a, 6.1b for the hoop 4.1 and 7.1a, 7.1b for the hoop 5.1.

At least one of the hoops, namely the front hoop 4.1 in the example considered, is mounted to rotate about a geometrical axis X1-X1 parallel to the geometrical axis X-X of the pedal.

The pedal 1 is preferably provided on each of its sides with a front hoop and a rear hoop. The hoops on the side opposite that visible in FIG. 1 are designated by reference numbers that are deduced from those used above by replacing the digit 1 with the digit 2 after the period, the description of these identical elements not being repeated. The faces of the pedal and the hoops are symmetrical with respect to the geometrical axis X-X.

The branches of the hoops are connected by a crossmember 6.1c, 7.1c, which are preferably substantially rectilinear, parallel to the geometrical axis of the pedal.

The rotary hoop 4.1 is spring-loaded by spring means E1 toward the other hoop 5.1.

A stop 8.1a, 8.1b is provided on the body 2 for each of the branches 6.1a, 6.1b, which are pressed against these stops by the spring means E1 in the absence of a cleat between the hoops 4.1 and 5.1. The stops 8.1a and 8.1b are constituted by plane walls that are substantially vertical when the mean plane of the pedal is horizontal. The stops 8.1a, 8.1b have a width, i.e. a dimension in a direction parallel to the articulation geometrical axis X1-X1 of the hoop 4.1, greater than In the manufacturing tolerance for the distance between the branches 6.1a, 6.1b. This distance may vary by several millimeters from one hoop to the other, with the result that the width of the stops 8.1a, 8.1b may be greater than 5 mm, preferably less than 10 mm.

When the body 2 is produced in plastic material, the contact between the branches 6.1a, 6.1b and the stops 8.1a, 8.1b is linear before hammering of the stop face by the branches of the spring. As these branches bear against the stops, an imprint may be formed on the stops so that the area of contact increases via a cylindrical portion.

It is to be noted that because of the relatively wide tolerances for the distance between the branches 6.1a and 6.1b, it would not be opportune to provide an initial imprint in the stops 8.1a, 8.1b because it would not systematically correspond to the position of the branches 6.1a, 6.1b. By providing plane faces 8.1a, 8.1b, the production of imprints is enabled at the precise location of the branches of the hoop 4.1. The stops 8.1a, 8.1b are spaced from each other in the direction parallel to the geometrical axis of the pedal so that the central area of the pedal body is free.

Figure 3:
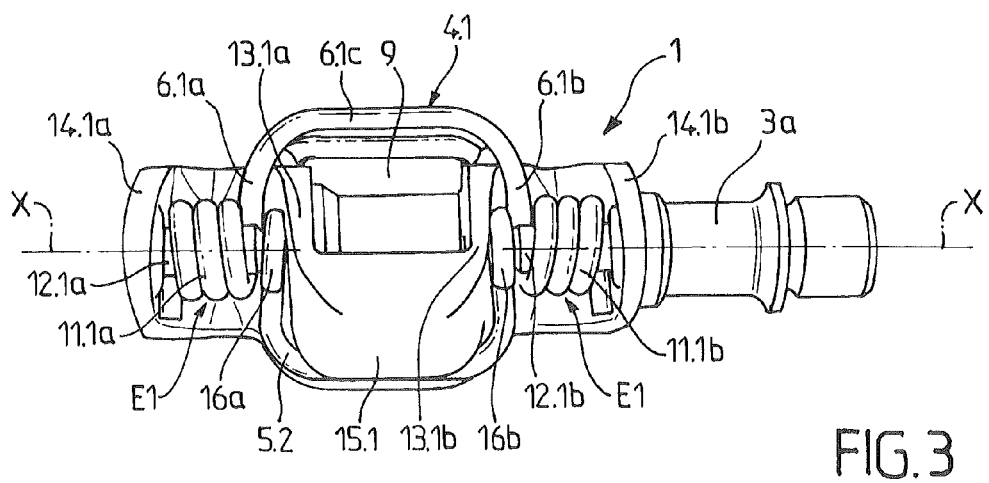
FIG. 3 is a front view of the FIG. 1 pedal.
Figure 4:
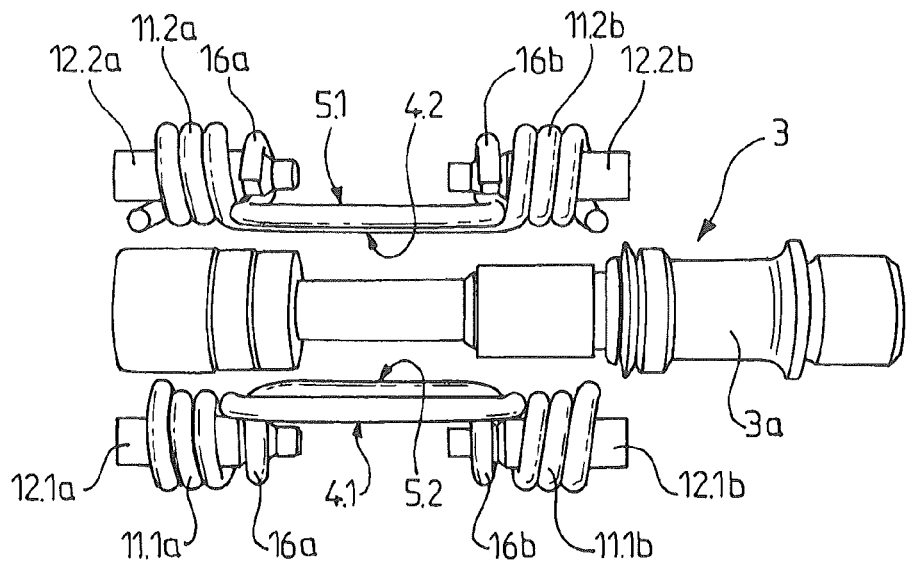
FIG. 4 is a plan view of components of the FIG. 1 pedal the body of which has been removed.

The spring-loading means E1 of the rotary hoop 4.1 are situated outside the space between the branches 6.1a, 6.1b in a direction orthogonal to the branches, i.e. parallel to the geometrical rotation axis X1-X1. As may be seen in FIG. 3, a large clearance 9 is obtained in this way in a central area of the pedal as the spring-loading means E1 are outside this space.

Stops 10.1a, 10.1b similar to the stops 8.1a, 8.1b are provided on the body 2 and oriented toward the rear for the branches 7.1a, 7.1b of the rear hoop 5.1. The stops 10.1a, 10.1b are preferably symmetrical to the stops 8.1a, 8.1b with respect to a plane passing through the geometrical, axis X-X, this plane being vertical when the pedal is horizontal.

The rotary hoop 4.1 is constituted by a metal wire, of circular or elliptical or rectangular or square cross section, and the spring-loading means E1 are advantageously constituted by turns 11.1a, 11.1b provided at each free end of the branches of the hoop. The turns 11.1a, 11.1b form a winding located outside the space between the branches of the hoop 4.1. Articulation axles 12.1a, 12.1b supported by orifices provided in the body 2 pass through the turns 11.1a, 11.1b, respectively. The axes 12.1a, 12.1b are coaxial and aligned. Their length is short so as to leave free the central portion of the pedal, at the level of the space 9.

Alternatively, the mobile hoop on each side could be rotatably mounted on a single one-piece axle that would pass through the central portion of the pedal body.

Figure 5:
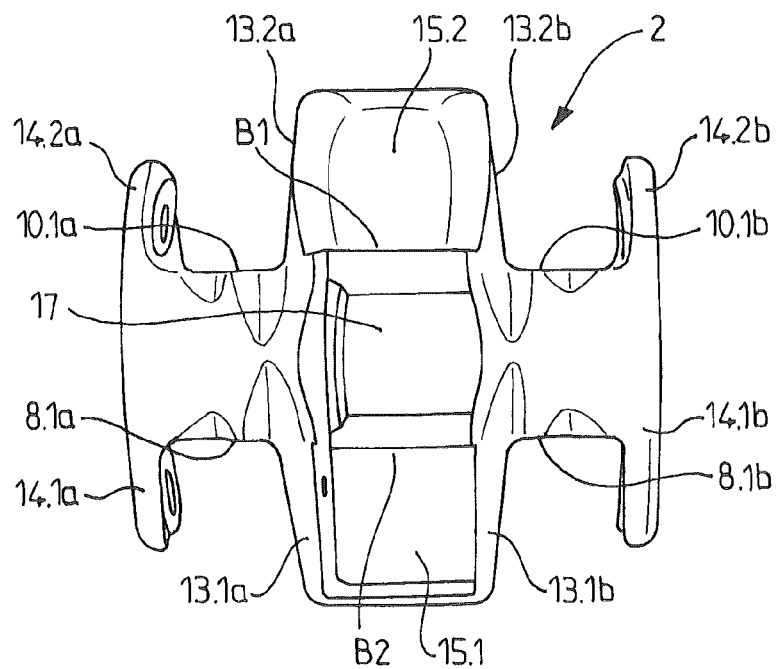
FIG. 5 is a plan view of the body of the FIG. 1 pedal.
Figure 6:
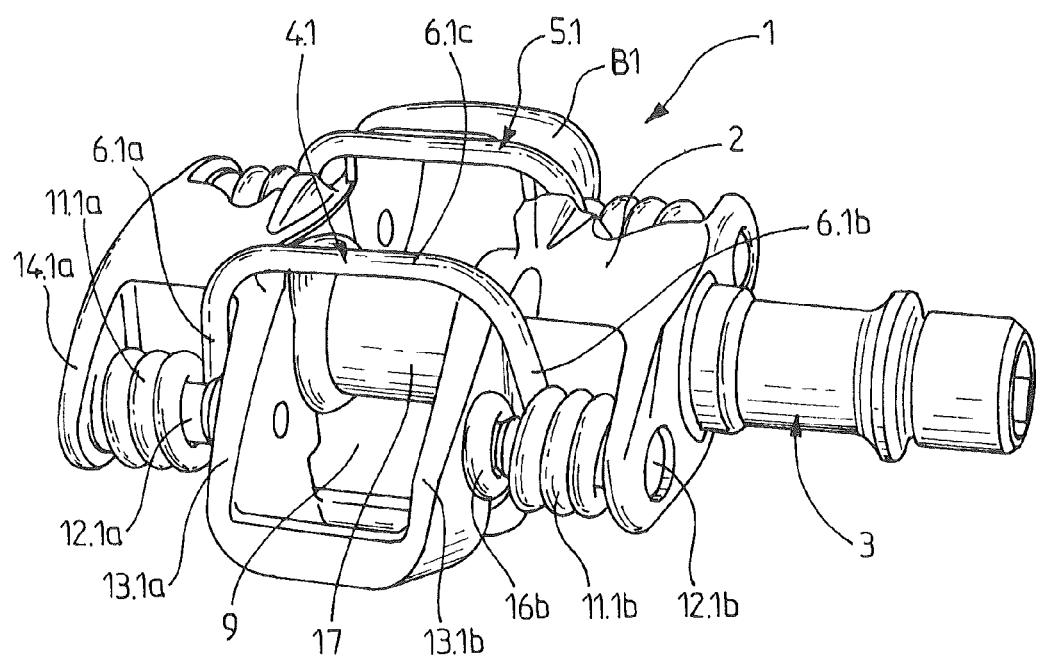
FIG. 6 is a perspective view of the pedal from the front and slightly from the side.

As may be seen in FIG. 5, the pedal body 2 is provided with interior arms 13.1a, 13.1b spaced from the exterior arms 14.1a, 14.1b to form yokes provided with facing orifices in which are engaged and supported at each of their ends the axles 12.1a, 12.1b. The turns 11.1a, 11.1b are also housed between the arms 13.1a, 14.1a and 13.1b and 14.1b. A wall 15.1 connects the arms 13.1a, 13.1b to form the avoidance boss 52 of the fixed hoop 5.2 of the opposite face. The surface of the wail 15.1 turned toward the hoop 4.1 is inclined toward the front so as not to congest the space 9 between branches and to facilitate evacuation of mud.

The embodiment of the spring means E1 with turns is not limiting on the invention. Other spring means may be envisaged, notably a flexing blade or a compression member, acting against the branches of the hoop 4.1 to press them elastically against the stops 8.1a, 8.1b.

In a different embodiment, the front hoop 4.1 on one side and the rear hoop 5.2 on the other side may form one and the same part, constituting a double hoop, spring-loaded by spring means, notably torsion springs, distinct from the hoop and situated outside the hoop.

The rear hoop 5.1 is constituted of a metal wire curved to a U-shape with the free ends of the branches curved in a loop 16a, 16b situated in a plane substantially orthogonal to thou defined by the crossmember 7.1c of the hoop and the branch concerned. The loop, or lug, 16a, 16b is situated inside the turns 11.2a, 11.2b of the hoop 4.2 on the opposite side of the pedal, in the vicinity of the adjacent interior arm of the pedal body. The articulation axles 12.2a, 12.2b of the rotary hoop 4.2 on the opposite side have the loops 16a, 16b passing through them.

This rear hoop 5.1 abuts against the front edge of the avoidance boss B1 formed by the wall 15.2 that connects the interior arms 13.2a, 13.2b of the opposite side of the pedal.

Thus the rear hoop 5.1 is held fixed between the stops 10.1a, 10.1b and the front edge of the boss B2.

The pedal body 2 includes a central, globally cylindrical shank 17 having an interior housing adapted to receive the axle 3 of the pedal. The cylindrical housing of the central shank 17 is closed at the exterior end by a stopper 18 (FIG. 2) that is flush with the surface of the exterior arm 14.1a. The stopper 18, which screws on, for example, axially immobilizes a ball or other bearing situated at the end of the pedal axle 3.

The axles 12.1a, 12.1b, 12.2a, 12.2b are engaged from the exterior of the pedal body in the direction of the central portion, via the orifices produced in the arms of this pedal body. The axles are retained axially in position, for example by knurling at the axle end engaged in the orifices of the arms of the pedal body.

The space between the hoops 4.1 and 5.1 is designed to receive and clamp a cleat C (FIG. 2) fixed to the bottom of a cycling shoe sole. To attach the cleat, the cyclist forces the cleat past the rear hoop 5.1 by a rear to front movement of the foot. Unintentional attachment of this hoop is prevented by the boss B2. The cyclist, then engages the front of the cleat under the rotary hoop 4.1 and, by exerting a vertical pressure on the sole and the cleat, moves the hoops 4.1 and 5.1 apart to attach the cleat between the hoops. The cyclist disengages the cleat by a twisting movement of the foot which causes forward movement of the rotary hoop 4.1 and disengagement of the cleat.

The pedal body 2 may be produced in plastic material the hardness of which is less than that of the branches of the metal hoops that come to bear against the body. In particular, the branches 6.1*a*, 6.1*b* of the rotary hoop 4.1, acted on by the spring-loading means, exert a relatively high pressure on the surfaces of the slots 8.1*a*, 8.1*b* as well as shocks when disengaging.

To prevent or at least reduce wear and hammering of these surfaces 8.1*a*, 8.1*b* in their areas of contact with the branches of the hoop, a plastic material may be molded over the branches 6.1*a*, 6.1*b*, which are substantially vertical when the pedal is horizontal, in order to increase the areas of contact between these branches and the pedal body. A relatively wide contact is obtained in this way between the plane surfaces of the stops of the body and the overmolded surfaces, which tend to flatten out under pressure, and no longer simple linear contact between the plane surfaces of the body and a generatrix of the metal cylinder constituted by a branch of the hoop.

Thus, according to the invention, on each side of the pedal, the cleat attachment mechanism is composed of:
- a mobile front hoop 4.1, 4.2 the turns of which are exterior, enabling total clearance at the front of the pedal and facilitating evacuation of mud, offering a lightweight product with a geometry emphasizing this lightness,
- a fixed rear hoop 5.1, 5.2 having two loops 16*a*, 16*b* through which pass small spring axles 12.1*a*, 12.1*b*, the branches of this rear hoop being in double abutment in the body and thus retained fixed in position,
- short spring axles 12.1*a*, 12.1*b* yoked between the arms of the pedal body.

Figure 2:
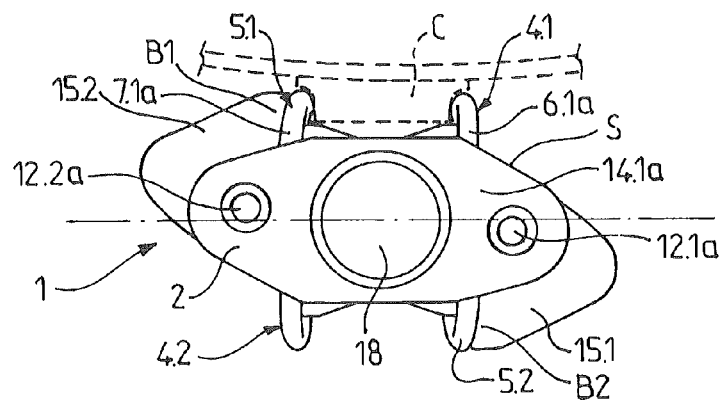
FIG. 2 is a left-hand side view of the FIG. 1 pedal.

As may be seen in FIG. 2, when the pedal body is horizontal, the articulation axis 12.1*a* situated at the front is preferably below the mean horizontal plane of the pedal body while the rear articulation axis 12.2*a* is above this mean plane. The surface S of the upper edge of the arms of the pedal body is inclined downward from the central part of the body toward the front end to facilitate attaching the cleat as disclosed in FR 2 850 079.

The invention claimed is:

1. A bicycle pedal with automatic engagement and disengagement, comprising a body rotatably mounted on a pedal axle with, on one side at least, a rotary hoop and a non-rotary hoop, each hoop having two branches connected by a cross-member, the rotary and non-rotary hoops being disposed, respectively, on opposite ones of a front and a rear of the body, the rotary hoop being mounted to rotate about a geometrical axis (X1-X1) parallel to an axis (X-X) of the pedal and being spring-loaded toward the non-rotary hoop by spring, means, the space between the hoops being adapted to receive and to clamp a cleat fixed to the bottom of a cycling shoe; the spring means of the rotary hoop being situated, in a direction orthogonal to the branches of the rotary hoop, outside the space between the respective branches wherein the pedal body is provided with exterior arms spaced from interior arms to form yokes provided with facing orifices in which are engaged and supported at each of their ends two coaxial individual axles respectively associated with each branch, the individual axles composing an articulation axle of the rotary hoop, and wherein the individual axles are at a distance from each other in the central area, and the interior arms are spaced apart from each other, so as to leave free the central portion of the pedal, wherein:
- both sides of said pedal include the rotary and non-rotary hoops in a symmetrical manner with respect to the geometrical rotation axis (X-X) of the pedal,
- the rotary hoop comprises a metal wire and the spring-loading means are constituted by turns of a winding of the wire of the rotary hoop at the ends of the branches, the turns being situated totally outside the space between the branches and having the articulation axle of the rotary hoop pass through them, and
- the non-rotary hoop comprises a metal wire including, at each free end of its branches, a loop through which passes the articulation axle of the symmetrically mounted rotary hoop, each loop being situated in a plane substantially orthogonal to that defined by the cross-member of the non-rotary hoop and each respective branch and situated inside turns of the rotary hoop on opposite sides of the pedal.

2. The pedal claimed in claim 1, wherein the interior arms on the side opposite the rotary hoop are extended and join at a wall to form an avoidance boss against which the symmetrically mounted non-rotary hoop bears.

3. The pedal claimed in claim 1, wherein the rotary hoop is situated in front of the pedal, in the direction of movement of the bicycle.

4. The pedal claimed in claim 1, wherein the non-rotary hoop is retained in a fixed position by complementary stops provided on the pedal body, and the non-rotary hoop, on the side opposite the stops, bears against an avoidance boss provided on the pedal body.

5. The pedal claimed in claim 1, wherein the pedal body is produced in plastic material and is provided, for the rotary hoop, with stops constituted by a plane wall area parallel to the pedal axle.

6. The pedal claimed in claim 5, wherein the branches of the rotary hoop designed to come into contact with the stops provided on the pedal hod are overmolded with a plastic material in order to increase the areas of contact between the body and the branches of the rotary hoop.

* * * * *